Jan. 19, 1965     F. J. WODITSCH     3,165,840
ANGLE MEASURING AND SETTING DEVICE
Original Filed March 19, 1956     4 Sheets-Sheet 1

INVENTOR.
FRANK J. WODITSCH
BY
*Gregory S. Dolgorukov*
ATTORNEY.

Jan. 19, 1965

F. J. WODITSCH 3,165,840

ANGLE MEASURING AND SETTING DEVICE

Original Filed March 19, 1956

INVENTOR.
FRANK J. WODITSCH.
BY Gregory S. Dolgorukov
ATTORNEY.

INVENTOR.
FRANK J. WODITSCH
BY Gregory S. Dolgorukov
ATTORNEY.

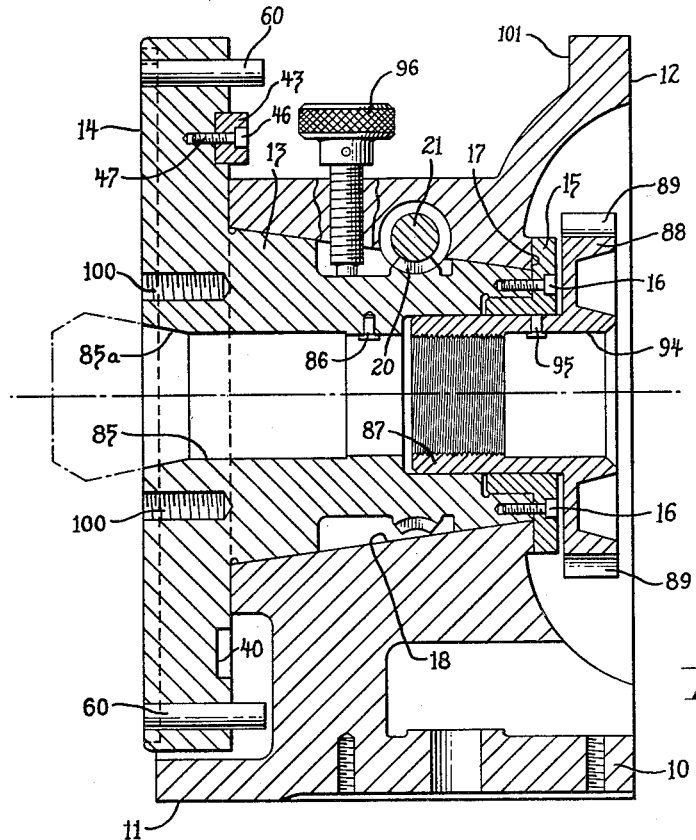
Fig. 7
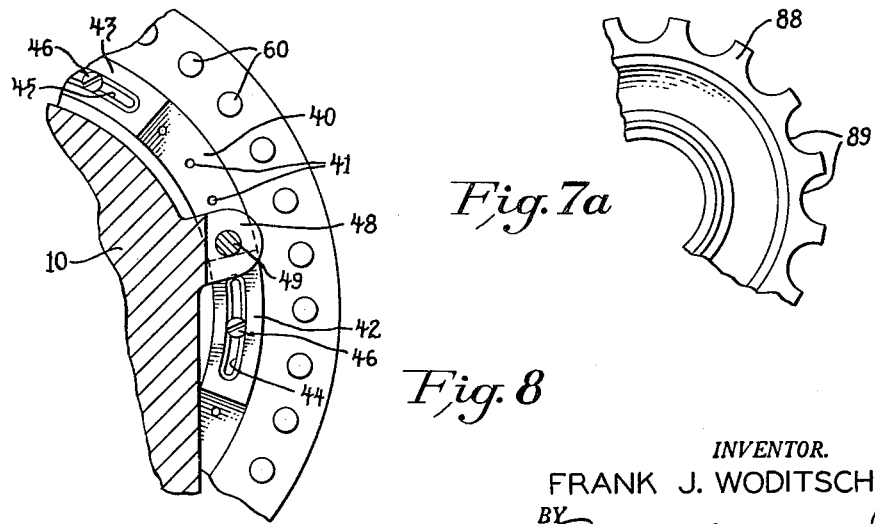
Fig. 7a
Fig. 8
INVENTOR.
FRANK J. WODITSCH
BY Gregory S. Dolgorukov
ATTORNEY.

United States Patent Office 3,165,840
Patented Jan. 19, 1965

3,165,840
ANGLE MEASURING AND SETTING DEVICE
Frank J. Woditsch, St. Clair Shores, Mich. (427 E. Eight Mile Road, Hazel Park, Mich.), assignor of twenty-five percent to Gregory S. Dolgorukov, Ferndale, Mich.
Continuation of application Ser. No. 572,564, Mar. 19, 1956. This application Aug. 27, 1962, Ser. No. 224,269
5 Claims. (Cl. 33—174)

This invention relates to measuring instruments or devices, and particularly to an improved device for measuring angles. The present application is a continuation of my co-pending application, Serial No. 572,564 filed March 19, 1956, now abandoned for Angle Measuring and Setting Device.

Great advances have been made within the last 40 years in the art of constructing measuring devices and improving measuring techniques. These advances, in turn, made it possible to improve manufacturing methods and to make quantity production of interchangeable parts possible. One of the first steps, the introduction of vernier, greatly improved precision of measurements done with graduated rulers or scales. The introduction of micrometers was a further step forward, and it made measurements within .001" possible. The next step was the introduction of measuring blocks, sometimes referred to in the art as Johanson blocks. With the aid of such blocks measurements within .0001" and even closer became attainable.

However, these advances improved measurements of linear distances. Measurements of angles remained substantially in the vernier stage, that is, use of vernier scales in connection with degree graduations provided on angle measuring devices and rotary tables or indexing heads, where measuring the angle through which the same were rotated or rotating such devices through a predetermined angle was necessary.

After the introduction of measuring blocks, a device called a sine bar was introduced with the aid of which it became possible to set in a machine a piece of work at an angle, or measure an angle at which a certain piece was set, by measuring with such blocks a trigonometric function and particularly the line representing the sine of the angle.

However, this expedient, in spite of its great utility, was limited substantially to the applications referred to above. The problem of constructing a rotary table or an indexing head in machines, such as vertical milling machines and the like, remained unsolved. With the demand for greater and greater precision of machining, and particularly greater precision in measuring angles in the process of machining various parts in milling machines and the like, the necessity of providing means for greater precision of angle measurements has been keenly felt for many years and has plagued the industry. Many attempted solutions of such problem proved to be either wholly inadequate or so costly as not to be practical. For instance, attempts have been made to measure the angle of rotation of a rotary table by the angle of rotation of a worm in a worm-and-gear drive provided for such table, with a view that because of the high ratio of rotation between table and the worm attainable through worm-and-gear drives, minute movements of the table would be multiplied as much as fifty (50) times or even more in the worm. It was found, however, that in the first place the worm drives are not reversible which fact produces an undesirable situation under many conditions. Furthermore, it was also found that the precision required in manufacturing the worm-and-gear drives that would produce the desired results was virtually unattainable with the present day methods, or required provision of very complicated and expensive compensating devices. As a result, a rotary table adapted to receive a piece of work in a machine and which could be quickly set at a predetermined angle with desired precision, such as five (5) seconds, was so complicated and costly as to make such devices available for industry only at a cost of thousands of dollars.

One of the objects of the present invention is to provide an improved rotary table or an indexing device whereby the above difficulties and disadvantages are overcome and largely eliminated, and with the aid of which measuring angles or setting the table at desired angles with accuracy of 10–5 seconds or even with greater precision is made possible.

Another object of the present invention is to provide a rotary table or indexing device of the character specified in the preceding paragraph, which gives in angle measurements accuracy of approximately one minute with the use of vernier incorporated therein.

A further object of the present invention is to provide a rotary table which can be used as an indexing or dividing head, as inspection centers, as an inspection jig with a collet or V-blocks, as a device for generating tangents to arcs in dressing grinding wheels and in similar operations, all used either in horizontal or in vertical positions.

A still further object of the present invention is to provide a rotary table in which accuracy of angle measurements is attained by the use of measuring blocks and in which measuring of the angle in any quadrant or in any portion of a given quadrant is always done at one predetermined place for all of the angles of the full circumference, which place is so selected with respect to the change of sine of an angle within a quadrant as to give the maximum precision of angle measurement considering other requirements important to the operation of the device.

A further object of the present invention is to provide an angle measuring and angle-setting device of the foregoing nature which is simple and rugged in construction, is easy to use and is relatively inexpensive to manufacture.

Further objects and advantages of this invention will be apparent from the following description and appended claims, reference being had to the accompanying drawings forming a part of this specification, wherein like reference characters designate corresponding parts in the several views.

FIG. 7 is a sectional view taken in the direction of the arrows on the section plane passed through the section line 7—7 of FIG. 2.

FIG. 7a is a fragmentary end view of the construction of FIG. 7 and showing a portion of the hand wheel.

FIG. 8 is the fragmentary view, partly in section, taken on the back of the face plate and showing adjustable stops for automatically stopping of the rotary plate in a predetermined position or positions.

Figure 1:
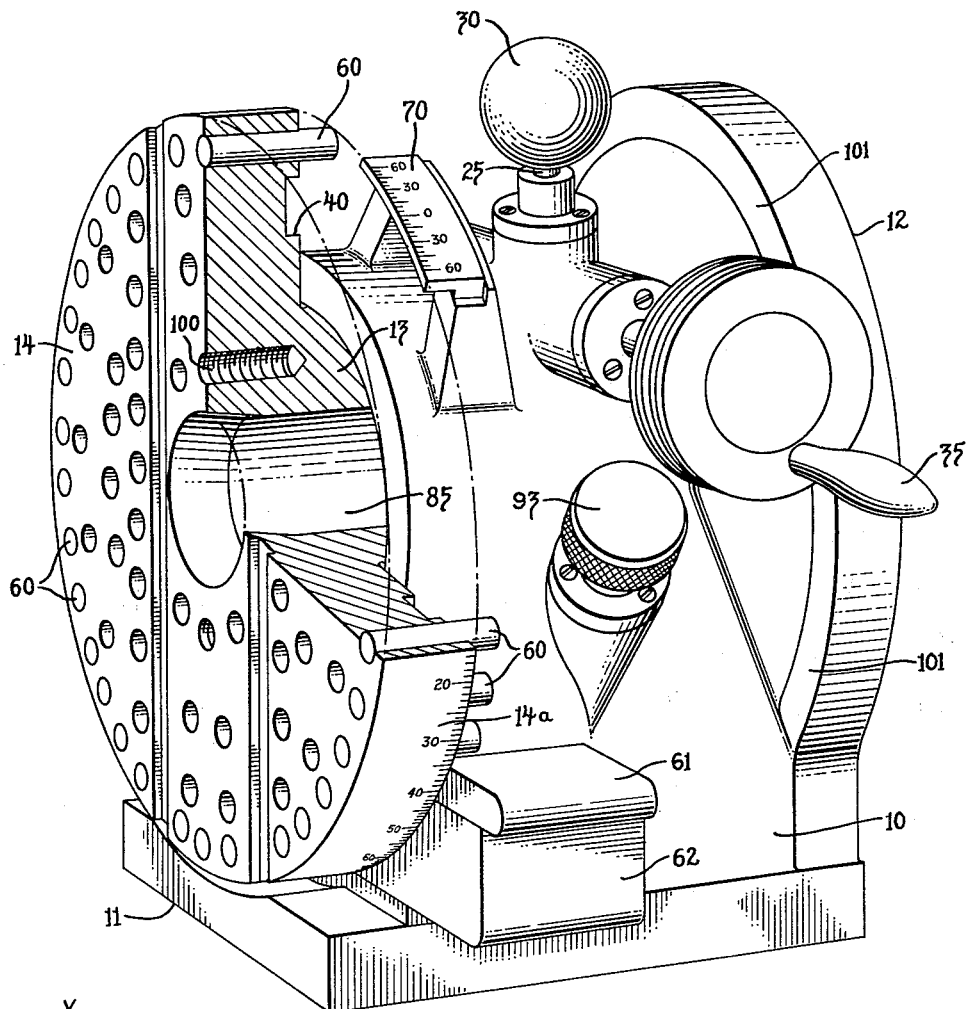
FIG. 1 is a perspective view showing a device embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I provide a rotary table on which there are provided a plurality of projections such as pins arranged parallel to the axis of the rotation of the table and dividing the circumference of the table into equal angular portions such as 10°. These pins are of equal diameter and are positioned with the utmost precision available with the present manufacturing methods. It will be understood that if the table is rotated through the angle of said 95°–5′–10″ each pin moves through precisely the same angle. In accordance with the invention measurement of this angle to the amount of full 90° is made from a graduation on the periphery of the rotary table, but the excess angle of 5°–5′–10″ is measured by measuring a linear distance related to a trigonometric function, and particularly the sine of this excess angle. The place at which such measurement is taken and the plane from which measurements are taken are so selected as to give desired precision of angle measurements, considering the relative rate of change of the angle and of the sine thereof, and also to have full bearing of the pin on the measuring blocks. The plane from which measurements are taken is made fixed in view of such requirements, and the measurements are always made from this plane to the next adjacent pin. The linear measurements so obtained are then translated into a measurement related to the sine of the excess angle, from which the excess angle itself is found from specially prepared tables. The sum of the angle read from the graduations on the rotary plate and of the excess angle so found give the total measured angle. Of course, full ten degree angle or any multiple thereof is precision set or measured with measuring blocks. Instead of blocks, micrometer screw measuring devices may also be used.

Referring particularly to the drawings, the device illustrated therein comprises a base structure generally designated by the numeral 10, which structure may be in the form of a steel casting having two perpendicular planes or flat surfaces such as 11 and 12. The perpendicularity of planes 11 and 12 is made precise. A conical bore 18 is provided in the base structure 10 wherein there is journaled for rotation the extension 13 of a rotary face plate 14. A heel bearing 15 secured to the extension 13 with the aid of screws 16 has a flange bearing on the face surface 17 provided on the base structure 10. This bearing acts also as a thrust bearing taking the forces that would otherwise tend to pull the extension 13 out of the conical bore 18.

Figure 4:
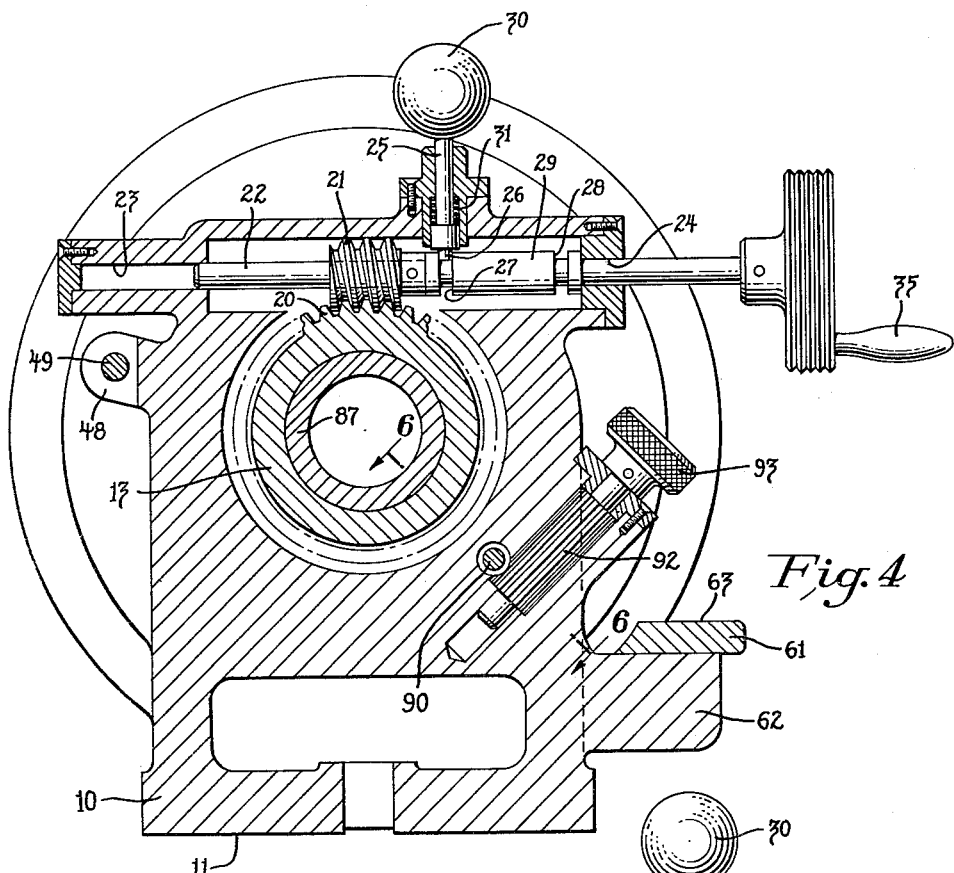
FIG. 4 is a sectional view, taken in the direction of the arrows on the section plane passing through the line 4—4 of FIG. 2.
Figure 5:
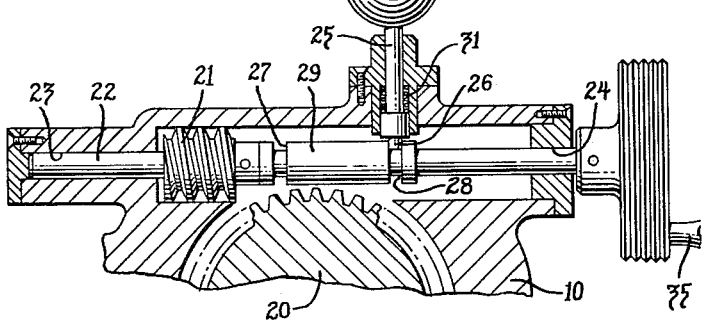
FIG. 5 is a fragmentary sectional view similar in part to the upper portion of FIG. 4 but showing the worm for driving the rotary face plate disengaged from its gear.

Means are provided to rotate the face plate 14 through a 360° angle in either direction. In the present embodiment of the invention said means are exemplified by a worm-and-gear drive including a gear 20 mounted on the extension 13, and a worm 21 provided on a shaft 22 journaled for rotation in bores 23 and 24. The shaft 22 is slidable within said bores for a distance sufficient to disengage the worm 21 from the gear 20, as is best shown in FIGS. 4 and 5.

For the purpose of fixing the shaft 22 longitudinally and thus to cause rotation of the gear 20, there is provided a spring-pressed stem 25 having a finger 26 entering annular slots 27 or 28 provided on the shaft 22 in the portion 29 thereof having increased thickness. By raising the stem 25 with the aid of of a ball handle 30 in opposition to spring 31, the finger 26 may be withdrawn from the slot 27 (see FIG. 4), whereupon the shaft 22 may be pushed to the left into the position thereof shown in FIG. 5. The finger 26 may then be lowered to enter the slot 28 and thus to lock the shaft 22 in its disengaged position shown in FIG. 5. When the shaft 22 is pushed in either direction for engagement or disengagement with the gear 20, it rotates said gear similarly to a rack and thus operates as a cylindrical rack. With the worm 21 disengaged as illustrated in FIG. 5, the plate 14 may be rotated by application of manual effort thereto. With the worm 21 engaging the gear 20 as shown in FIG. 4, rotation of the plate 14 is attained by rotating the shaft 22 with the aid of a handle 35. Such rotation of the plate is relatively slow and is used for movements within relatively small angles.

Means are provided whereby the rotary plate 14 is automatically stopped at a desired angular position. Said means are exemplified by a circular track 40 provided on the back face of the plate 14, in which there are provided a number of tapped holes such as 41 (see FIGS. 7 and 8). In the track 40 there are slidably fitted pieces 42 and 43, provided with shouldered slots 44 and 45. Screws such as 46, having their heads slidable in the wider portion of the slot and their shanks in the narrower portion thereof, engage the plate 14 with their threaded ends 47. Thus, pieces 42 and 43 may be moved to any position in the circular track 40 and fixed therein with the aid of the screws 46.

Figure 2:
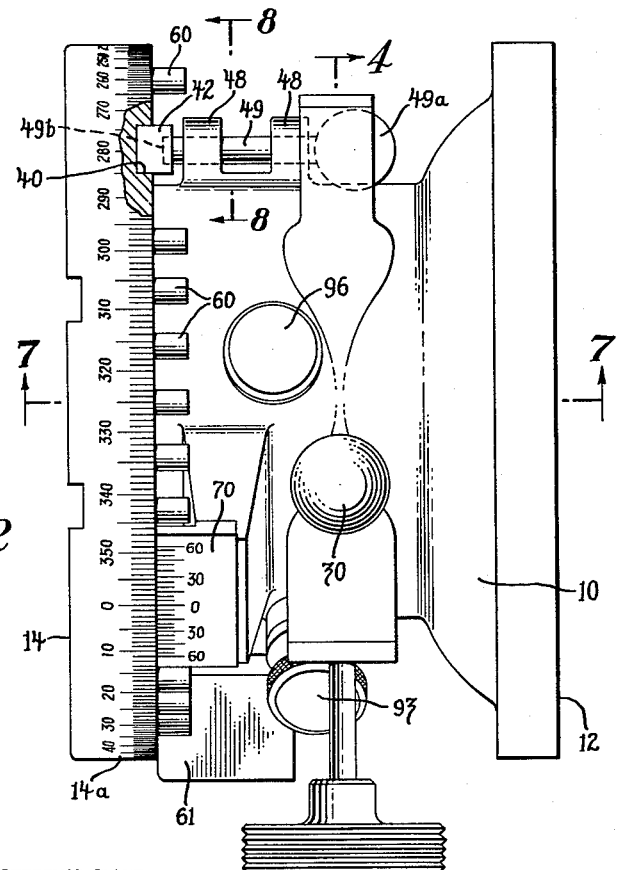
FIG. 2 is a top view of the device of FIG. 1.

Extensions 48 are provided on the base structure 10 (see FIGS. 2 and 8), in which extensions there is provided a slidable stop pin 49 having on one of its ends a ball handle 49a for convenience of manual operation, with its end 49b being adapted to enter the recess of the track 40 to the extent of providing a stop for the pieces 42 and 43.

Thus, when it is desired to have the plate 14 stop automatically in any desired position such, for instance, as to come to a stop at the extremities of a predetermined rotation range, the plate 14 is first brought into one of such positions with the pin 49 being pushed all the way toward the plate 14, whereupon one of the pieces is moved in the track 40 and brought in the position wherein it contacts the end of the pin 49. The screw 46 is then tightened fixing the piece in such a position. Thereupon the plate 14 is rotated in the opposite direction and brought into the other extremity of its rotation range, and the other piece is brought to bear against the pin 49 from the other side thereof and is similarly fixed in position with the aid of its screw 46. By virtue of such settings, the plate 14 can now rotate only within the range determined by the set positions of the pieces 42 and 43.

The means whereby precise measurements of the angles of rotation of the plate 14 are attained, and whereby the plate 14 may be rotated through precise predetermined angles, are exemplified by a plurality, in the present instance 36, of cylindrical pins 60 arranged on the plate 14 parallel to the axis thereof and at an equal radial distance from the axis thereof. The pins 60 are equidistantly arranged and, therefore, are set at equal angles apart. In the present embodiment of the invention the pins 60 are set 10° apart. It should be distinctly understood that precision in making pins 60 and in their locating on the plate 14 is of extreme importance and must be done with all the precision available in machining processes. It will be understood that the above angles of 10° are only exemplary and that smaller or larger angle portions may be used. For instance, 20 degree angles may also be desirable. 20 degree angles will decrease the number of pins, but will require measuring with blocks of larger linear distances.

A platform 61 is rigidly mounted on the extension 62 provided on the base structure 10. The top surface 63 of the platform 61 forms a plane from which measurements with blocks are made in a manner described below.

Figure 3:
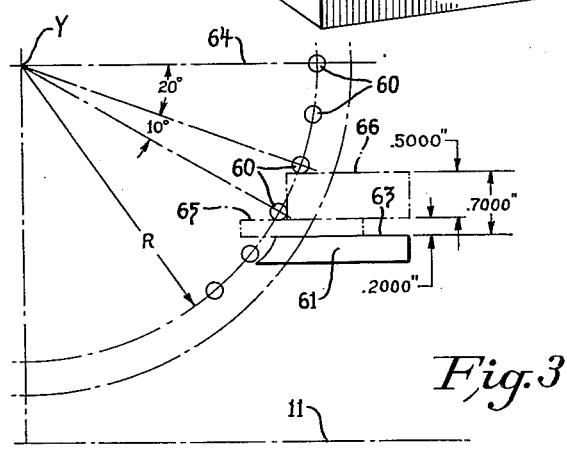
FIG 3 is a diagram illustrating arrangement of the measuring platform with respect to pins.

It is advantageous to have the plane 63 pass, if extended, at such a distance from the axis of the plate 14 as to ensure that sine measurements from said plane 63 will be done well within the range of the 45° angle from the surface 64, which surface passes through the axis Y of the plate 14 and is parallel to the surface 63. It can easily be appreciated that within such an angle sine changes are greater relative to the changes in the corresponding angles than they are in the range beyond 45°, and, therefore, greater precision of angle measurement is attained. It is also preferable to select radial distance R, diameter of the pins 60 and position of the plane 63 in such a manner that a measuring block of a certain round thickness placed on the surface 63 and reaching precisely the next adjacent pin, when plate 14 is positioned with the center of a pin 60 coinciding with plane 64, would receive an additional block also of some round dimension which would reach precisely over the next adjacent pin. In the present embodiment of the invention the above factors are so selected that a block 65 of .200″ in thickness placed between the surface 65 and a pin 60, the center of which is in the 30° position, would receive at its top surface a block 66 which is .500″ in thickness and contacts a pin in 20° position. As can be seen from examination of FIG. 3, under such conditions the total distance from the pin 60 in 20° position to the surface 63 is .700″. By virtue of such an expedient precision measuring and setting of angles of 10 degrees or multiples thereof with standard blocks can be easily and rapidly done.

The plate 14 is made cylindrical to provide circumferential surface 14a which is graduated into degrees in a manner well known in the art. This graduated surface cooperates with a zero mark and a fixed vernier 70 provided on the base structure 10 and graduated in a manner well known in the art to give precision of reading of one minute accuracy.

Figure 3A:
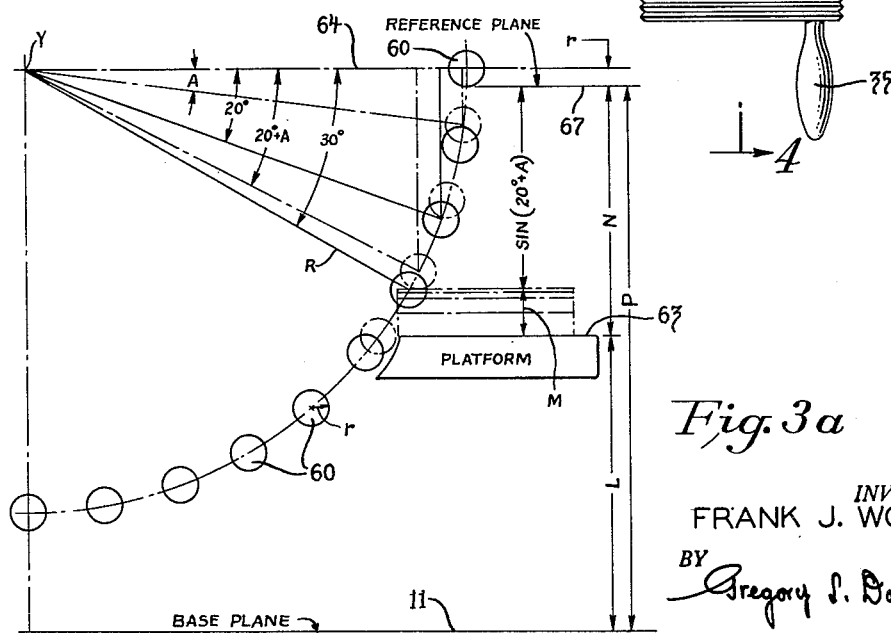
FIG. 3a is a diagram illustrating the concept of angle measurements on which the device disclosed herein is based.

Referring to FIG. 3a it will now be seen that if the plate 14 is rotated, either in measuring or in setting an angle, through an angle A which is less than 10°, all of the pins 60 will rotate through the same angle A. Therefore, if the sine of the angle A can now be measured with the aid of blocks, the value of the angle A can be ascertained from tables in which sines of angles corresponding to the known R are given.

From an examination of FIG. 3a it can be clearly seen that sine of the angle A, which sine is the perpendicular from the center of the pin in A° position on the plane 64 and which would be measured as a distance between the two planes parallel to the plane 64 and tangent to the lowermost points of the pin in the 0° position and in the A° position, cannot be measured directly because of the interference of the pin in 0° position.

However, by measuring with measuring blocks the distance M from the plane 63 to the pin in (20°+A°) position, we thus find the value of the sine and the angle of (20°+A°) which is equal to N minus M, with N being equal to the distance between the planes 63 and 64, which distance is known. The distance between the plane 63 and the base plane 11 is designated by the letter L. Thus, the distance P from the plane 11 to the reference plane 67 is equal to $L+N$.

Inasmuch as the distance R is known, tables of sines for various angles for that particular value of R can be made up. From these tables, knowing the value of sine of the angle (20°+A°), we can find the value of the angle (20°+A°) and, therefore, the angle A itself.

It will now be understood that the angle A represents the actual measured or set-up angle only when such measured or set-up angle is less than 10°. However, if the measured or the set-up angle is greater than 10°, angle A will represent merely the excess by which the measured or the set-up angle exceeds 10° or any multiple thereof, such as 20°, 30°, etc., up to and including 350°. However, the full degrees or multiple of 10° angles are easily ascertained from the graduations provided on the surface 14a of the device. Therefore, by adding to such degree reading the angle A, we find the exact measured or set-up angle.

It will now be appreciated in view of the foregoing, that precision of 10° angles being ensured by precise positioning of the pins 60, and the precision of the excess angle A in measuring or in setting-up being ensured by measuring with blocks the linear distance related to its sine, uncomparably greater precision of angle measurements can be attained with the above disclosed device than has been possible heretofore.

Means are provided whereby the rotative plate 14 can receive various collets and compress them inwardly to hold various pieces of work therein. In accordance with the invention, the plate 14 and its extension 13 are provided with a bore generally designated by the numeral 85 and conforming in a manner well known in the art to the outside surfaces of standard collets. A key 86 is provided on the extension 13 at said bore to engage the longitudinal slot in a collet and to serve as a drive key therefor. Compressing of the collet jaws is effected by pulling it inwardly of the bore 85 with the aid of the internally threaded tubular member 87 entering the bore from the opposite end thereof. The member 87 is provided with a hand wheel 88 having around its periphery a plurality of recesses 89.

It will now be understood that as the wheel 88 is rotated to engage the thread on the end of the collet, after the outside surfaces of the collet come in tight contact with the internal surfaces of the bore 85, further rotation of the hand wheel 88 will tend to pull the collet further into the recess 85. Because of the action of the converging surfaces 85a, such pulling force will produce components acting radially on the slotted collet end and will push the jaws together, locking frictionally the member held in the central opening of the collet.

Figure 6:
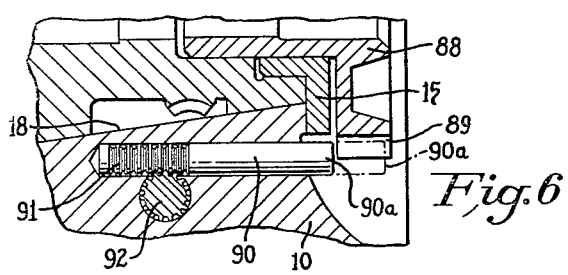
FIG. 6 is a sectional view taken in the direction of the arrows on the section plane passing through the line 6—6 of FIG. 4.

Means are provided to prevent loosening of the collet, which could occur if the wheel 88 would be free to rotate or to loosen up while the device is in operation. Such means are exemplified by a locking pin 90 (see FIGS. 4 and 6), the end 90a of which is adapted to enter into recesses 89 of the hand wheel 88 for locking the wheel from rotation. The pin 90 is provided with a cylindrical rack portion 91 engaged by a pinion 92 which is manually operable with the aid of a knurled head 93. The wheel 88 may be rotated manually. Rotating the whell 88 may also be done with the aid of a suitable handle (not shown) having a cylindrical portion adapted to enter the bore 94, and having a slot engaged by the driving key 95.

A locking screw 96 may be used to lock the plate 14 in place. A number of tapped holes 100 is provided on the face of the plate 14, in order that various clamps and other devices may be connected to the plate 14 to hold securely various pieces of work on said plate.

The device may be used with the plate 14 being in vertical position or in a horizontal position. In the latter case, the device will rest on its surface 12, with the surface 101 being used as clamping surface. It will be understood that in such position of the device the hand wheel 88 may not be accessible for manual operation. For unscrewing the wheel to release the jaws of the collet, the locking pin 90 is moved with the aid of the knurled head 93 into the position for locking the wheel, whereupon the plate 14 may be rotated with the aid of the worm-and-gear drive by operating the handle 35 until the jaws of the collet open.

A great number of various machining operations involving angle measurements or setting-up angles may be performed with the above disclosed device. The number of these operations is so vast and so varied that describing such operations in detail would produce a prohibitively voluminous record. It is believed that such description is not necessary for the purpose of understanding the present invention, beyond what has been stated above in the objects of the present invention.

I claim:
1. In a device for measuring and setting up work angles, a base structure providing a reference plane, a circular plate mounted on said structure and rotatable through 360 degrees in a plane normal to said reference plane, said plate including a peripheral surface divided into 360 degrees, at least twenty cylindrical pins of equal diameters permanently fixed on said plate and arranged thereon parallel to the axis thereof at equal distances from each other and with the axes of said pins lying in a cylindrical surface the axis of which coincides with the axis of rotation of said plate, said pins dividing the circumference of said plate into a corresponding number of division angles; a zero reference mark on said base structure provided with vernier and adapted to be used in conjunction with the divisions on the peripheral surface of said plate, manually operated means for rotating said plate; and a stationary platform provided on the base structure and having a flat surface parallel to said reference plane and providing a plane from which to measure with the aid of measuring blocks coming in direct contact with the respective pin the linear perpendicular distance to the pin adjacent said platform surface and constituting a trigometric function of an angle related to the work angle, said platform clearing all of the pins when the plate is rotated, with said flat surface of the platform intersecting, if continued, the pin centers circle in a chord-like manner and approximately at the middle of the radius of the plate and of said pin centers perpendicular to the reference plane in order that a measuring block placed on said platform surface and abutting on the immediately adjacent pin would have a full bearing with its working surface on the next pin, with measuring of any work angle within the 360 degree range being done by measuring to the last full division angle by reading the graduated scale, and measuring the angle representing the exact difference between such reading and the work angle by measuring said linear distance only within the range of angles from 0 to 45 degrees of a quadrant as determined by the diameter of said plate parallel to said reference plane, the distance of said fixed pins from the axis of the plate being so selected that the linear perpendicular distance between the bearing surfaces of two adjacent pins as measured from the platform surface, with said pins being in positions which would give measurement of the angle equal to the angle between the adjacent pins, is expressed in simple fractional numbers of an inch.

2. The invention defined in claim 1, said plate having a central opening adapted to receive a collet, and threaded means associated with said plate to operate the jaws of said collet to lock the same.

3. The invention defined in claim 1, and including adjustable stop means for determining the range of angles for rotation of said plate.

4. A device for measuring and setting up work angles, a base structure providing a reference plane, a circular plate approximately seven inches in diameter mounted on said structure and rotatable around a fixed axis through 360° in a plane normal to said reference plane, said plate including a peripheral surface forming a graduated scale divided into 360°, a zero reference mark provided on said base structure and adapted to be used in conjunction with the divisions on said graduated scale, 36 cylindrical pins of equal diameters permanently fixed on said plate and arranged thereon parallel to the axis thereof at equal distances from each other and with the axes of said pins lying in a cylindrical surface the axis of which coincides with the axis of rotation of said plate, said pins divdiing the circumference of said plate into 36 division angles of 10° each, manually operated means for rotating said plate, a stationary platform provided on the base structure and having a flat surface parallel to said reference plane and providing a plane from which to measure with the aid of measuring blocks coming in direct contact with the respective pin the linear perpendicular distances to the pin adjacent said platform surface and constituting a trigonometric function of an angle related to the work angle, said platform clearing all of the pins when the plate is rotated, with said platform plane, if continued, intersecting the pin centers circle in a chord-like manner and approximately at the middle of the radius of the plate of said pin centers circle perpendicular to the reference plane in order that a measuring block placed on said platform surface and abutting on one of the pins would have a full bearing with its working surface on the next pin; with the measuring of any work angle within the 360° range being done by reading to the last full 10° by reading the graduated scale, and measuring the angle representing the exact difference between such reading and the work angle by measuring said linear distance with the measuring block only within the range of angles from 20° to 30° of a quadrant as determined by the diameter of said plate parallel to said reference plane, the distance of said fixed pins from the plate being so selected that the linear distance between the bearing surfaces of the two adjacent pins as measured by the measuring blocks in said 10° angle between 20° and 30° angles is equal to .500".

5. The invention defined in claim 4, the radial distance of said fixed pins from the axis of the plate being so selected that tie linear perpendicular distance from the platform surface to the pin in the 30° position is .200" and to the pin in the 30° position is .700".

References Cited in the file of this patent
UNITED STATES PATENTS 2,351,246 Walling _____ June 13, 1944
2,509,338 Elliott _____ May 30, 1950

FOREIGN PATENTS 866,851 Germany _____ Feb. 12, 1953